United States Patent Office 3,799,878
Patented Mar. 26, 1974

3,799,878
METHOD OF HYDRAULIC TRANSMISSION OF POWER AND HYDRAULIC FLUID COMPOSITIONS THEREFOR
Youji Komatsu, Ichihara, and Tohru Kamita and Kazuo Tanaka, Soka, Japan, assignors to Maruzen Oil Company Limited, Osaka, Japan
No Drawing. Filed July 15, 1971, Ser. No. 163,059
Claims priority, application Japan, July 21, 1970, 45/63,733
Int. Cl. C09k 3/00
U.S. Cl. 252—79        20 Claims

ABSTRACT OF THE DISCLOSURE

A method of hydraulic transmission of power which comprises employing a fluid comprising a polyethylene glycol monopivalate of the general formula:

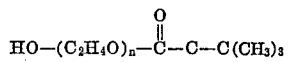

wherein $n$ represents an integer of 2–4, as a hydraulic fluid in fluid pressure systems.

The present invention relates also to a hydraulic fluid composition comprising the polyethylene glycol monopivalate having 2–4 oxyethylene groups as a principal component.

BACKGROUND OF THE INVENTION

Field of the invention

The present invention relates to hydraulic fluids suitable for use in fluid pressure systems such as motor vehicle brakes, motor vehicle clutches, shock absorbers, hydraulic jacks and hydraulic elevators. The hydraulic fluids employed in the present invention are particularly useful as a motor vehicle brake fluid which requires strict characteristics.

Description of the prior art

Hydraulic fluids used in fluid pressure systems, particularly in motor vehicle brakes should satisfy many severe requirements. They must have viscosities sufficient for prevention of leakness from sliding portions and for maintenance of their lubricity and high boiling points sufficient for avoiding vapor lock. In addition, they must not be corrosive against various metals used in brake mechanism, and they must not cause excessive swelling of the rubber members such as rubber cups and rubber hoses. For a long period durability, a reduced hygroscopicity, a good water tolerance and excellent physical and chemical stabilities at a wide temperature range are required.

A single compound which satisfies the above various requirements in combination is extremely rare, As hydraulic fluids such as brake fluids, there have been used mixtures of various components such as a lubricant, a solvent, a modifier and additives, for example, an antioxidant. However, some of the ordinary brake fluids do not satisfy some of the requirements for an ideal brake fluid, and fluids which satisfy all of the requirements are too expensive for practical use. As lubricants contained in these hydraulic fluids, there have been used, for example, castor oil, glycol ricinoleates and polyoxyalkylene fluids of relatively high molecular weights. These lubricants for hydraulic fluids are nonvolatile liquids which transmit pressures ideally and have a suitable lubricity. As the solvents for hydraulic fluid, there have been employed various compounds of low molecular weights such as alcohols, ketones, glycols, glycol ethers and the like. These solvents are used mainly to keep the viscosities of hydraulic fluids within a desirable range.

In U.S. Pat. No. 3,003,968, it is disclosed that ethylene glycol diesters and polyethylene glycol diesters having 1–6 oxyethylene groups and at least 10 carbon atoms can be used as hydraulic fluids without incorporation of any lubricant, solvent or additive. However, some glycol diesters have a relatively poor stability, and some of them cause relatively high degree of swelling of rubber.

One of the primary objects of the present invention is to provide an improved method of transmission of power by means of an excellent hydraulic fluid in fluid pressure systems. Another object of the present invention is to provide excellent hydraulic fluids such as a brake fluid suitable for use in fluid pressure systems. Still another object of the invention is to provide hydraulic fluids posssessing a low swelling action on rubber, low hygroscopicity, and excellent anticorrosive property, lubricity and stability. Further object of the invention is to provide a method of utilizing a single class of compounds as a hydraulic fluid such as brake fluids without incorporation of any lubricant, solvent or the like.

SUMMARY OF THE INVENTION

The present invention relates to an improved method of hydraulic transmission of power by means of a hydraulic fluid in fluid pressure systems. More particularly, the present invention provides a method of hydraulic transmission of power which comprises employing a fluid comprising a polyethylene glycol monopivalate of the general formula:

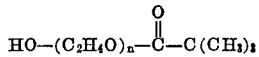

wherein $n$ represents an integer of 2–4, as a hydraulic fluid in fluid pressure systems.

According to the present invention, there is also provided a hydraulic fluid composition comprising the polyethylene glycol monopivalate having 2–4 oxyethylene groups as a principal component.

DETAILED DESCRIPTION OF THE INVENTION

It has now been found that polyethylene glycol monopivalates having 2–4 oxyethylene groups hardly react on rubber and various metals; they have low hydroscopicities and high boiling points and they are excellent in physical stability, chemical stability, water tolerance and lubricity. Accordingly, fluids comprising the polyethylene glycol monopivalate as a main component can be used as excellent hydraulic fluids such as motor vehicle brake fluids and, in addition, the polyethylene glycol monopivalate can be used solely as a hydraulic fluid without incorporation of any lubricant, solvent or the like.

Polyethylene glycol monopivalates having 2–4 oxyethylene groups are represented by the general formula:

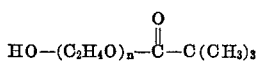

wherein $n$ represents an integer of 2–4. Concretely, said compounds include diethylene glycol monopivalate, triethylene glycol monopivalate and tetraethylene glycol monopivalate. These polyethylene glycol monopivalates can be used as hydraulic fluids either alone or in the form of a mixture of them. It is beyond expectation that these polyethylene glycol monopivalates show various properties required for hydraulic fluids such as brake fluids even if other components such as lubricants and solvents are not incorporated therein.

Preferred hydraulic fluids consisting of the polyethylene glycol monopivalates include diethylene glycol monopivalate alone, a mixture of diethylene glycol monopivalate (more than about 40 vol. percent based on the mixture) and triethylene glycol monopivalate, a mixture of diethylene glycol monopivalate (more than about 65 vol. percent based on the mixture) and tetraethylene glycol monopivalate and a mixture of diethylene glycol monopivalate (more than about 45 vol. percent based on the mixture), triethylene glycol monopivalate and tetraethylene glycol monopivalate. Though triethylene glycol monopivalate and tetraethylene glycol monopivalate can be used independently as a hydraulic fluid, it is preferred to use them in the form of a mixture with diethylene glycol monopivalate, since their viscosities at a low temperature are relatively high.

In the synthesis of the polyethylene glycol monopivalates employed as a hydraulic fluid according to the present invention from, for example, polyethylene glycols and pivalic acid, the reaction product contain, in addition to the desired polyethylene glycol monopivalates, unreacted polyethylene glycols, i.e., diethylene glycol, triethylene glycol, tetraethylene glycol and by-products polyethylene glycol dipivalates, i.e., diethylene glycol dipivalate, triethylene glycol dipivalate, tetraethyene glycol dipivalate. It is not necessary to isolate the desired products completely from the unreacted compounds and the by-products, since the isolation process is very expensive. If the polyethylene glycol dipivalate having 2–4 oxyethylene groups (by-products) and the polyethylene glycol having 2–4 oxyethylene groups (unreacted compounds) are contained in the polyethylene glycol monopivalate in an amount of not more than about 20 wt. percent based on the final hydraulic fluid, respectively, the hydraulic fluid still has a relatively low swelling action on rubber and relatively low hydgroscopicity. These unreacted compounds and by-products serve as solvents for the hydraulic fluid.

Though polyethylene glycol monopivalates having 2–4 oxyethylene groups can be used as hydraulic fluids without incorporation of any other component, their properties are improved further by incorporating other components, i.e., conventional lubricants for hydraulic fluids, conventional solvents for hydraulic fluids, etc. In such a case, the advantages of polyethylene glycol monopivalates are not expected if polyethylene glycol monopivalate contents are too small. Preferably, the content of polyethylene glycol monopivalate in hydraulic fluid compositions is at least about 40 wt. percent, particularly about 60 wt. percent based on the final hydraulic fluid composition. (The contents of components are based on the final hydraulic fluid compositions in this specification.)

Hydraulic fluid compositions comprising the polyethylene glycol monopivalate as a main component include a composition comprising the polyethylene glycol monopivalate and a lubricant for hydraulic fluids, a composition comprising the polyethylene glycol monopivalate and a solvent for hydraulic fluids and a composition comprising the polyethylene glycol monopivalate, a lubricant and a solvent for hydraulic fluids. In hydraulic fluid compositions comprising the triethylene glycol monopivilate and the tetraethylene glycol monopivalate as a main component, it is preferable to incorporate the main components with about 10–30 wt. percent or more based on the final composition of a solvent for hydraulic fluids possessing low viscosities at a low temperature, since the viscosities of said triethylene glycol monopivalate and tetraethylene glycol monopivalate are relatively high at low temperatures.

In the present invention, known lubricants for hydraulic fluids such as polyoxyalkylene fluids of relatively high molecular weights, castor oil, glycol ricinoleates and the like may be incorporated with the polyethylene glycol monopivalates, i.e., diethylene glycol monopivalate, triethylene glycol monopivalate, tetraethylene glycol monopivalate, mixtures of two or more of them. The polyoxyalkylene fluids for hydraulic fluids are polyoxyalkylene glycols, ethers and esters of these glycols having molecular weights of about 300–15,000. As the polyoxyalkylene fluids, there may be mentioned, for example, polyethylene glycol, polypropylene glycol, poly(oxyethylene-oxypropylene) glycol, ethers and esters of these glycols and the like. The polyoxyalkylene fluids are prepared generally by reacting alkylene oxides such as ethylene oxide, propylene oxide or a mixture of them with an initiator such as water, a monohydric alcohol, i.e., methanol or ethanol, a dihydric alcohol such as ethylene glycol or a trihydric alcohol such as glycerol. Thus prepared polyoxyalkylene glycols may be esterified with acetic acid, adipic acid, sebacic acid, succinic acid, etc. Among these polyoxyalkylene fluids, a copolymer of ethylene oxide and propylene oxide is preferred. The lubricants are used in a quantity sufficient for improving lubricity of hydraulic fluid compositions. The contents of the polyoxyalkylene fluids are generally not more than about 30 wt. percent, preferably about 10–20 wt. percent based on the final compositions, and contents of castor oil and glycol ricinoleates are generally not more than about 10 wt. percent, preferably about 1–5 wt. percent based on the final compositions.

As the solvents to be incorporated into the hydraulic fluid compositions of the present invention, the conventional solvents for hydraulic fluids, such as various alcohols, ketones, glycols and glycol ethers can be used. Examples of these solvents are alcohols of 1–8 carbon atoms such as methanol, ethanol, propanol and butanol, ketones of 4–10 carbon atoms such as diacetone alcohol, glycols of 2–12 carbon atoms such as ethylene glycol, diethylene glycol, triethylene glycol, tetraethylene glycol, propylene glycol, dipropylene glycol and 2-methyl-2,4-pentanediol, glycol ethers of 3–14 carbon atoms such as ethylene glycol monoethyl ether, diethylene glycol monomethyl ether, diethylene glycol monoethyl ether, diethylene glycol monopropyl ether, diethylene glycol monobutyl ether, triethylene glycol monomethyl ether, triethylene glycol monoethyl ether, triethylene glycol monopropyl ether and triethylene glycol monobutyl ether.

Further, glycol diesters also can be incorporated as a solvent in hydraulic fluid compositions of the present invention. Preferred glycol diesters are those containing 6–22 carbon atoms such as diethylene glycol dipropionate, triethylene glycol dipropionate, tetraethylene glycol dipropionate, diethylene glycol dibutylate, triethylene glycol dibutylate, tetraethylene glycol diacetate, pentaethylene glycol diacetate, pentaethylene glycol dipropionate, hexaethylene glycol diacetate, hexaethylene glycol dipropionate, triethylene glycol divalerate, ethylene glycol dipivalate, diethylene glycol dipivalate, triethylene glycol dipivalate, tetraethylene glycol dipivalate and the like.

Among the solvents, alcohols have only low flash points, alcohols having 4 or more carbon atoms and glycol diesters possess high degree of swelling action on rubber, glycols possess high viscosities at a low temperature, glycol ethers possess high hygroscopicities and some of glycol ethers possess high degree of swelling action on rubber and some of glycol ethers have poor stability. Accordingly, these solvents should not be incorporated in excessive quantities with the polyethylene glycol monopivalates in the present invention. Preferred solvents are glycol ethers particularly, diethylene glycol monomethyl ether, ethylene glycol monoethyl ether and diethylene glycol monoethyl ether.

The solvents are incorporated in a quantity sufficient for improving mainly viscosity characteristics of hydraulic fluid compositions to keep the viscosity within a desired range. The alcohol, the ketone, the glycol ether and the glycol diester solvents are effective for improving viscosity characteristics at a low temperature of hydraulic fluid compositions, because their viscosities at a low temperature are low. The glycol solvents are effective for elevating boiling points of hydraulic fluid compositions. The solvents are also effective to facilitate dissolution of various additives in the hydraulic fluid compositions. The solvents serve also as extenders. Contents of the solvents in the hydraulic fluid compositions are not more than about 40 wt. percent, usually not more than about 30 wt. percent, preferably about 5–20 wt. percent based on the final compositions.

Reference will be made to preferred hydraulic fluid compositions according to the present invention. In hydraulic fluid compositions containing diethylene glycol monopivalate as a principal component, preferably not more than about 30 wt. percent based on the final compositions of a lubricant for hydraulic fluids is incorporated. On the other hand, in hydraulic fluid compositions containing triethylene glycol monopivalate, tetraethylene glycol monopivalate or a mixture of them as a principal component, preferably not more than about 40 wt. percent, usually not more than about 30 wt. percent of a solvent for hydraulic fluids, particularly the glycol ether solvent; or not more than about 40 wt. percent, usually not more than about 30 wt. percent of the solvent and not more than about 30 wt. percent of the lubricant are incorporated. Hydraulic fluid compositions comprising as a principal component a mixture of diethylene glycol monopivalate and triethylene glycol monopivalate, a mixture of diethylene glycol monopivalate and tetraethylene glycol monopivalate or a mixture of diethylene glycol monopivalate, triethylene glycol monopivalate and tetraethylene glycol monopivalate are preferably incorporated with not more than about 30 wt. percent of the lubricant; not more than about 40 wt. percent, usually not more than about 30 wt. percent of the solvent; or not more than about 30 wt. percent of the lubricant and not more than about 40 wt. percent, usually not more than about 30 wt. percent of the solvent. In the hydraulic fluid compositions containing the above mixtures as a principal component, quantity of the solvent can be minimized by employing the following mixtures: a mixture of more than about 40 vol. percent, based on the mixture, of diethylene glycol monopivalate and the remainder of triethylene glycol monopivalate, a mixture of more than about 65 vol. percent, based on the mixture, of diethylene glycol monopivalate and the remainder of tetraethylene glycol monopivalate, and a mixture of more than about 45 vol. percent, based on the mixture, of diethylene glycol monopivalate and the remainder of triethylene glycol monopivalate and tetraethylene glycol monopivalate.

If desired, various ordinary additives such as an antioxidant, a corrosion inhibitor, an antifoaming agent, a pH regulator and the like may be incorporated in the polyethylene glycol monopivalate hydraulic fluids or compositions comprising the polyethylene glycol monopivalates as a principal component in the present invention. As antioxidants, there may be mentioned, for example, bisphenols, phenyl alpha-naphthylamine, phenyl beta-naphthyl-amine, diphenyl-amine, 2,6 - di-tert-butyl-4-methyl-phenol, 2,4-dimethyl-6-tert-butyl-phenol, zinc dialkyl dithiophosphate and the like. As corrosion inhibitors, there may be mentioned, for example, borax, alkylamines, alkanolamines, benzothiazole, benzotriazole, morpholine, triphenyl phosphite, sodium nitrate and the like. These additives are used generally in quantities of about 0.1–1.5 wt. percent based on the hydraulic fluids or the final hydraulic fluid compositions, respectively.

The present invention will be illustrated by reference to the following examples.

EXAMPLE 1

A mixture of one mole of pivalic acid and 2.5 moles of diethylene glycol was heated under reflux in toluene solvent with p-toluene sulfonic acid as the esterification catalyst to synthesize diethylene glycol monopivalate while water was taken out from the system. The resulting reaction mixture was purified to obtain diethylene glycol monopivalate. In the same manner, triethylene glycol monopivalate and tetraethylene glycol monopivalate were synthesized from pivalic acid and triethylene glycol, and pivalic acid and tetraethylene glycol, respectively.

These polyethylene glycol monopivalates were tested according to the test methods described in Japanese Industrial Standards (JIS) K 2233–1970 "Motor Vehicle Brake Fluids." The results are shown in Tables 1 and 2.

TABLE 1

| Properties | JIS K 2233 Class 2-2 | Diethylene glycol monopivalate |
|---|---|---|
| Boiling point (° C.) | 190 minimum | 250 |
| Flash point (° C.) | 82 minimum | 134 |
| Viscosity (cstks.): | | |
| (−40° C.) | 1,800 maximum | 931 |
| (50° C.) | 4.2 minimum | 4.72 |
| (100° C.) | 1.5 minimum | 1.70 |
| Stability at high temperature (° C.) (185±2° C., 2 h.) | When boiling point is above 225° C., change in boiling is within [3+0.05 (boiling point: 225)]. | 1 |
| Corrosion loss (mg./cm.²) (100+2° C., 120±2 hr.): | | |
| Tinned from | Within 0.2 | 0.07 |
| Steel | do | 0.08 |
| Aluminum | Within 0.1 | 0.02 |
| Cast iron | Within 0.2 | 0.02 |
| Brass | Within 0.4 | 0.13 |
| Copper | do | 0.13 |
| Cold test: | | |
| (−40±2° C., 144±4 h.) | (¹) | Pass |
| (−50±2° C., 6±0.2 h.) | (²) | Pass |
| Water tolerance: | | |
| (−40±2° C., 22±2 h.) | (³) | Pass |
| (60±2° C., 22±2 h.) | (⁴) | Pass |
| Compatibility:⁵ | | |
| (−40±2° C., 22±2 h.) | (⁶) | Pass |
| (60±2° C., 22±2 h.) | (⁷) | Pass |
| Rubber swell (mm.): (70±2° C., 120±2 h.): | | |
| Natural rubber cup | 0.15–1.4 | 0.7 |
| SBR cup | 0.15–1.4 | 0.7 |
| (120±2° C., 70±2 h.): SBR cup | 0.15–1.4 | 0.9 |

¹ If a bottle containing the sample is stood upside down, bubbles should rise up to the liquid surface within 10 seconds. Stratification or precipitation should not be recognized.
² If a bottle containing the sample is stood upside down, bubbles should rise up to the liquid surface within 35 seconds. Stratification or precipitation should not be recognized.
³ If a bottle containing the sample is stood upside down, bubbles should rise up to the liquid surface within 10 seconds. Stratification or precipitation should not be recognized.
⁴ Stratification should not be recognized. Sediment after centrifugal separation should not be more than 0.05 vol. percent.
⁵ Commercially available "Wagner Lockheed 21 B" (registered trademark: a product of Wagner Electric Co.) was used as the brake fluid to be mixed with the sample.
⁶ Stratification or precipitation should not be recognized.
⁷ Stratification should not be recognized. Sediment after centrifugal separation should not be more than 0.05 vol. percent.

TABLE 2

| Properties | Triethylene glycol monopivalate | Tetraethylene glycol monopivalate |
|---|---|---|
| Boiling point (° C.) | 291 | 310 |
| Flash point (° C.) | 174 | 190 |
| Viscosity (cstks.): | | |
| (−40° C.) | 2,870 | 6,755 |
| (50° C.) | 6.38 | 8.65 |
| (100° C.) | 2.13 | 2.56 |
| Stability at high temperature (° C.) (185±2° C., 2 h.) | 1 | 1 |
| Corrosion loss (mg./cm.²) (100±2° C., 120±2 h.): | | |
| Tinned iron | 0.07 | 0.08 |
| Steel | 0.08 | 0.09 |
| Aluminum | 0.03 | 0.02 |
| Cast iron | 0.02 | 0.02 |
| Brass | 0.12 | 0.10 |
| Copper | 0.13 | 0.12 |
| Water tolerance: | | |
| (−40±2° C., 22±2 h.) | Pass | Pass |
| (60±2° C., 22±2 h.) | Pass | Pass |
| Compatibility: | | |
| (−40±2° C., 22±2 h.) | Pass | Pass |
| (60±2° C., 22±2 h.) | Pass | Pass |
| Rubber swell (mm.): (70±2° C., 120±2 h.): | | |
| Natural rubber cup | 0.15 | 0.2 |
| SBR cup | 0.2 | 0.4 |
| (120±2° C., 70±2 h.): SBR cup | 0.3 | 0.5 |

As clearly understood from the above Tables 1 and 2, diethylene glycol monopivalate, triethylene glycol monopivalate and tetraethylene glycol monopivalate can be used as a hydraulic fluid without incorporation of any other components. These compounds show low swelling actions on rubber.

Hygroscopicities of said polyethylene glycol monopivalates were measured. The samples were maintained at a temperature of 35° C. and humidity of 82% for 48 hours in the open cups and the water contents of the samples were analyzed before and after the test. For comparison, the same test was carried out on the other brake fluids. The results are shown in Table 3.

TABLE 3

|  | Water content (wt. percent) | |
|---|---|---|
|  | Before test | After test |
| Diethylene glycol monopivalate | 0.13 | 5.8 |
| Triethylene glycol monopivalate | 0.15 | 8.3 |
| Tetraethylene glycol monopivalate | 0.20 | 10.0 |
| Diethylene glycol monomethyl ether | 0.35 | 21.6 |
| Commercial brake fluid [1] | 0.16 | 15.4 |

[1] Principal component: dipropylene glycol.

As clearly shown in Table 3, diethylene glycol monopivalate, triethylene glycol monopivalate and tetraethylene glycol monopivalate show a low hygroscopicity. Accordingly lowering in boiling point due to contamination of water is slow and these polyethylene glycol monopivalates can be used for a long period. On the other hand, hydraulic fluid compositions containinng glycol ethers and glycols as the principal components show high hygroscopicities.

REFERENCE EXAMPLE 1

Triethylene glycol dipivalate and tetraethylene glycol dipivalate were subjected to the rubber swelling test described in JIS K 2233–1970. The results are shown in Table 4.

TABLE 4

| Rubber swell (mm.) | Triethylene glycol dipivalate | Tetraethylene glycol dipivalate |
|---|---|---|
| (70±2° C., 120±2 h.): | | |
| Natural rubber cup | 3.5 | 2.5 |
| SBR cup | 3.9 | 3.2 |
| (120±2° C., 70±2 h.): SBR cup | 5.3 | 3.2 |

As clearly shown in Table 4, glycol diesters such as triethylene glycol dipivalate and tetraethylene glycol dipivalate cause very high degree of rubber swelling.

EXAMPLE 2

A hydraulic fluid composition, containing diethylene glycol monopivalate as the principal component of the following composition, was prepared.

| | Wt. percent |
|---|---|
| Diethylene glycol monopivalate | 80 |
| Castor oil | 2 |
| Copolymer of ethylene oxide and propylene oxide (having viscosity of 30 cst. at 100° C.) | 16.95 |
| Triethanolamine | 0.5 |
| Benzothiazole | 0.05 |
| 2,6 - di - tert - butyl - 4 methylphenol | 0.5 |

Thus prepared hydraulic fluid composition passed the JIS K 2233–1970 specification Class 2—2 and the Society of Automotive Engineers' specification J 1703a (SAE specification). The composition has a viscosity of 1600 centistokes at −40° C. and change in boiling point revealed in the stability test at a high temperature was 2° C. The same composition as above except that castor oil was not contained had nearly similar characteristics as above.

EXAMPLE 3

A hydraulic fluid composition containing polyethylene glycol monopivalates as the principal components was prepared according to the following recipe.

| | Wt. percent |
|---|---|
| Diethylene glycol monopivalate | 80 |
| Tetraethylene glycol monopivalate | 16.95 |
| Castor oil | 2 |
| Triethanolamine | 0.5 |
| Benzothiazole | 0.05 |
| 2,6-di-tert-butyl-4-methylphenol | 0.5 |

Thus prepared hydraulic fluid composition passed the above JIS K 2233–1970 and SAE J 1703a specifications. The composition has a viscosity of 1300 centistokes at −40° C.

Further, the same hydraulic fluid composition as above except that half the quantity of tetraethylene glycol monopivalate was replaced with triethylene glycol monopivalate, the same hydraulic fluid composition as above except that tetraethylene glycol monopivalate was replaced with triethylene glycol monopivalate and the same hydraulic fluid composition as above except that castor oil was not contained were prepared. All of these compositions met the above specifications.

EXAMPLE 4

A hydraulic fluid composition containing triethylene glycol monopivalate as the principal component was prepared according to the following recipe.

| | Wt. percent |
|---|---|
| Triethylene glycol monopivalate | 84.45 |
| Diethylene glycol monomethyl ether | 12.5 |
| Castor oil | 2.0 |
| Triethanolamine | 0.5 |
| Benzothiazole | 0.05 |
| 2,6-di-tert-butyl-4-methylphenol | 0.5 |

Thus prepared hydraulic fluid composition met said JIS K 2233–1970 and SAE J 1730a specifications. The composition had a viscosity at −40° C. of 1650 centistokes and the result of the rubber swelling test according to the specification of JIS K 2233–1970 was 0.3–0.5 mm.

EXAMPLE 5

A hydraulic fluid composition containing tetraethylene glycol monopivalate as the principal component was prepared according to the following recipe.

| | Wt. percent |
|---|---|
| Tetraethylene glycol monopivalate | 75.0 |
| Diethylene glycol monomethyl ether | 21.95 |
| Castor oil | 2.0 |
| Triethanolamine | 0.5 |
| Benzothiazole | 0.05 |
| 2,6-di-tert-butyl-4-methylphenol | 0.5 |

Thus prepared hydraulic fluid composition had a viscosity at −40° C. of 1600 centistokes and the result of the rubber swelling test according to JIS K 2233–1970 was 0.3–0.5 mm., and the composition met the above JIS K 2233–1970 and SAE J 1703a specifications.

EXAMPLE 6

A hydraulic fluid composition containing diethylene glycol monopivalate as the principal component was prepared according to the following recipe.

| | Wt. percent |
|---|---|
| Mixture consisting of 79.1 wt. percent of diethylene glycol monopivalate, 18.0 wt. percent of diethylene glycol dipivalate and 2.9 wt. percent diethylene glycol | 80 |
| Castor oil | 2 |
| Copolymer of ethylene oxide and propylene oxide and propylene oxide (viscosity: 30 cst. at 100° C.) | 16.95 |
| Triethanolamine | 0.5 |
| Benzothiazole | 0.05 |
| 2,6-di-tert-butyl-4-methylphenol | 0.5 |

Thus prepared hydraulic fluid composition met the above JIS K 2233–1970 and SAE J 1730a specifications. The composition had a viscosity at −40° C. of 1700 centistokes and the result of the rubber swelling test according to JIS K 2233–1970 was 0.5–0.7 mm.

EXAMPLE 7

A hydraulic fluid composition containing diethylene glycol monopivalate as the principal component was prepared according to the following recipe.

| | Wt. percent |
|---|---|
| Diethylene glycol monopivalate | 53.95 |
| Diethylene glycol dipivalate | 20.0 |
| Diethylene glycol | 20.0 |
| Castor oil | 5.0 |
| Triethanolamine | 0.5 |
| Benzothiazole | 0.05 |
| 2,6-di-tert-butyl-4-methylphenol | 0.5 |

Thus prepared hydraulic fluid composition met the above JIS K 2233–1970 and SAE J 1703a specifications. The composition had a viscosity at −40° C. of 1400 centistokes and the result of the rubber swelling test according to JIS K 2233–1970 was 0.9–1.3 mm.

What is claimed is:

1. In a method of hydraulic transmission of power by means of a hydraulic fluid in fluid pressure systems, the improvement which comprises employing a fluid consisting essentially of a polyethylene glycol monopivalate having 2–4 oxyethylene groups as the hydraulic fluid.

2. In a method of hydraulic transmission of power by means of a hydraulic fluid in fluid pressure systems, the improvement according to claim 1 which comprises employing a polyethylene glycol monopivalate having 2–4 oxyethylene groups as the hydraulic fluid.

3. A hydraulic fluid composition consisting essentially of (1) at least 40% by weight of at least one polyethylene glycol monopivalate having 2–4 oxyethylene groups, and (2) at least one member selected from the group consisting of (a) in an amount not more than 30% by weight, at least one lubricant selected from the group consisting of a polyoxyalkylene fluid having a molecular weight of 300–15,000, castor oil and glycol ricinoleate, said castor oil and said ricinoleate being present in amounts not more than 10% by weight, (b) in an amount not more than 40% by weight, at least one solvent selected from the group consisting of an alcohol having 1–8 carbon atoms, a ketone having 4–10 carbon atoms, a glycol having 2–12 carbon atoms, a glycol ether having 3–14 carbon atoms and a glycol diester having 6–22 carbon atoms (c) in an amount of from 0.1 to 1.5% by weight, at least one antioxidant selected from the group consisting of a bisphenol, phenyl alphanaphthylamine, phenyl betanaphthylamine, diphenylamine, 2,6-di-tertbutyl-4-methyl-phenol, 2,4 - dimethyl-6-tertbutyl-phenol, and a zinc dialkyl dithio-phosphate, and (d) in an amount of from 0.1 to 1.5% by weight, at least one corrosion inhibitor selected from the group consisting of borax, an alkylamine, an alkanolamine, benzothiazole, benzotriazole, morpholine, triphenyl phosphite and sodium nitrate.

4. A hydraulic fluid composition according to claim 3 consisting essentially of (1) at least one polyethylene glycol monopivalate having 2–4 oxyethylene groups and (2) at least one lubricant selected from the group consisting of a polyoxyalkylene fluid having a molecular weight of 300–15,000, castor oil and glycol ricinoleate.

5. A hydraulic fluid composition according to claim 3 consisting essentially of (1) at least one polyethylene glycol monopivalate having 2–4 oxyethylene groups and (2) at least one solvent selected from the group consisting of an alcohol having 1–8 carbon atoms, a ketone having 4–10 carbon atoms, a glycol having 2–12 carbon atoms, a glycol ether having 3–14 carbon atoms and a glycol diester having 6–22 carbon atoms.

6. A hydraulic fluid composition according to claim 3 consisting essentially of (1) at least one polyethylene glycol monopivalate having 2–4 oxyethylene groups, (2) at least one lubricant selected from the group consisting of a polyoxyalkylene fluid having a molecular weight of 300–15,000, castor oil and glycol ricinoleate, and (3) at least one solvent selected from the group consisting of an alcohol having 1–8 carbon atoms, a ketone having 4–10 carbon atoms, a glycol having 2–12 carbon atoms, a glycol ether having 3–14 carbon atoms and a glycol diester having 6–22 carbon atoms.

7. A hydraulic fluid composition according to claim 4 in which the lubricant is a polyoxyalkylene fluid having a molecular weight of 300–15,000.

8. A hydraulic fluid composition according to claim 4 in which the lubricant is castor oil.

9. A hydraulic fluid composition according to claim 5 in which the solvent is a glycol ether having 3–14 carbon atoms.

10. A hydraulic fluid composition according to claim 5 in which the solvent is a glycol having 2–12 carbon atoms.

11. A hydraulic fluid composition according to claim 5 in which the solvent is a glycol diester having 6–22 carbon atoms.

12. A hydraulic fluid composition according to claim 6 in which the lubricant is a polyoxyalkylene fluid having a molecular weight of 300–15,000 and the solvent is a glycol ether having 3–14 carbon atoms.

13. A hydraulic fluid composition according to claim 5 in which the solvent is a mixture of a polyethylene glycol dipivalate having 2–4 oxyethylene groups and a polyethylene glycol having 2–4 oxyethylene groups.

14. A hydraulic fluid composition according to claim 3 consisting essentially of (1) at least one polyethylene glycol monopivalate having 2–4 oxyethylene groups, (2) at least one antioxidant selected from the group consisting of a bisphenol, phenyl alphanaphthylamine, phenyl betanaphthylamine, diphenylamine, 2,6-di-tert-butyl-4-methyl-phenol, 2,4-dimethyl-6-tert-butyl-phenol and a zinc dialkyl dithiophosphate, and (3) at least one corrosion inhibitor selected from the group consisting of borax, an alkylamine, an alkanolamine, benzothiazole, benzotriazole, morpholine, triphenyl phosphite and sodium nitrate.

15. A hydraulic fluid composition according to claim 3 consisting essentially of (1) at least one polyethylene glycol monopivalate having 2–4 oxyethylene groups, (2) at least one lubricant selected from the group consisting of a polyoxyalkylene fluid having a molecular weight of 300–15,000, castor oil and glycol ricinoleate, (3) at least one antioxidant selected from the group consisting of a bisphenol, phenyl alphanaphthylamine, phenyl betanaphthylamine, diphenylamine, 2,6 - di - tert - butyl-4-methylphenol, 2,4-dimethyl-6-tert-butyl-phenol and a zinc dialkyl dithiophosphate, and (4) at least one corrosion inhibitor selected from the group consisting of borax, an alkylamine, an alkanolamine, benzothiazole, benzotriazole, morpholine, triphenyl phosphite and sodium nitrate.

16. A hydraulic fluid composition according to claim 3 consisting essentially of (1) at least one polyethylene glycol monopivalate having 2–4 oxyethylene groups, (2) at least one solvent selected from the group consisting of an alcohol having 1–8 carbon atoms, a ketone having 4–10 carbon atoms, a glycol having 2–12 carbon atoms, a glycol ether having 3–14 carbon atoms and a glycol diester having 6–22 carbon atoms, (3) at least one antioxidant selected from the group consisting of a bisphenol, phenyl alphanaphthylamine, phenyl betanaphthylamine, diphenylamine, 2,6-di-tert-butyl-4-methyl-phenol, 2,4-dimethyl-6-tert-butyl-phenol and a zinc dialkyl dithiophosphate, and (4) at least one corrosion inhibitor selected from the group consisting of borax, an alkylamine, an alkanolamine, benzothiazole, benzotriazole, morpholine, triphenyl phosphite and sodium nitrate.

17. A hydraulic fluid composition according to claim 3 consisting essentially of (1) at least one polyethylene glycol monopivalate having 2–4 oxyethylene groups, (2) at least one lubricant selected from the group consisting of a polyoxyalkylene fluid having a molecular weight of 300–15,000, castor oil and glycol ricinoleate, (3) at least one solvent selected from the group consisting of an alcohol having 1–8 carbon atoms, a ketone having 4–10 carbon atoms, a glycol having 2–12 carbon atoms, a glycol ether having 3–14 carbon atoms and a glycol diester having 6–22 carbon atoms (4) at least one antioxidant selected from the group consisting of a bisphenol, phenyl alpha-naphthylamine, phenyl betanaphthylamine, diphenylamine, 2,6-di-tert-butyl-4-methyl-phenol, 2,4 - dimethyl-6-tert-butyl-phenol, and a zinc dialkyl dithio-phosphate, and (5) at least one corrosion inhibitor selected from the group consisting of borax, an alkylamine, an alkanolamine, benzothiazole, benzotriazole, morpholine, triphenyl phosphite and sodium nitrate.

18. A composition of claim 3 in which the hydraulic fluid is a mixture of diethylene glycol monopivalate and triethylene glycol monopivalate, the diethylene glycol monopivalate being present in an amount of at least 40% by volume.

19. A composition of claim 3 in which the hydraulic fluid is a mixture of diethylene glycol monopivalate and tetraethylene glycol monopivalate, the diethylene glycol monopivalate being present in an amount of at least 65% by volume.

20. A composition of claim 3 in which the hydraulic fluid is a mixture of diethylene glycol monopivalate, triethylene glycol monopivalate and tetraethylene glycol monopivalate, the diethylene glycol monopivalate being present in an amount of at least 45% by volume.

References Cited

UNITED STATES PATENTS

| | | | |
|---|---|---|---|
| 2,599,803 | 6/1952 | Ballard et al. | 252—56 S |
| 2,886,590 | 5/1959 | Montgomery et al. | 252—79 X |
| 2,944,973 | 7/1960 | Langer et al. | 252—79 X |
| 3,003,968 | 10/1961 | Bruce et al. | 252—79 |
| 3,115,519 | 12/1963 | Crouse et al. | 252—56 S X |
| 3,341,574 | 9/1967 | Taylor et al. | 252—56 S X |

FOREIGN PATENTS

| | | | |
|---|---|---|---|
| 505,155 | 8/1954 | Canada | 252—79 X |

OTHER REFERENCES

"Polymeric Additives for Synthetic Ester Lubricants," F. J. Glavis, Industrial & Engr. Chem., vol. 42, No. 12 (December 1950), pp. 2441–46.

LEON D. ROSDOL, Primary Examiner

H. A. PITLICK, Assistant Examiner